(12) United States Patent
McLinn et al.

(10) Patent No.: US 8,419,314 B1
(45) Date of Patent: Apr. 16, 2013

(54) DEVICES AND METHODS FOR DIRECTING MIGRATION OF NON-AQUEOUS PHASE LIQUIDS FROM SEDIMENT

(75) Inventors: Eugene L. McLinn, Middleton, WI (US); John Rice, Fitchburg, WI (US)

(73) Assignee: TRC Environmental Corporation, Windsor, CT (US)

( * ) Notice: Subject to any disclaimer, the term of this patent is extended or adjusted under 35 U.S.C. 154(b) by 431 days.

(21) Appl. No.: 12/420,335

(22) Filed: Apr. 8, 2009

Related U.S. Application Data

(63) Continuation-in-part of application No. 12/259,017, filed on Oct. 27, 2008, now abandoned.

(60) Provisional application No. 60/982,626, filed on Oct. 25, 2007.

(51) Int. Cl.
*B09C 1/00* (2006.01)

(52) U.S. Cl.
USPC .................................. 405/129.57; 405/129.45

(58) Field of Classification Search ............. 405/129.75, 405/129.57, 129.45, 128.25, 128.3
See application file for complete search history.

(56) References Cited

U.S. PATENT DOCUMENTS

| | | | | |
|---|---|---|---|---|
| 5,080,528 A | * | 1/1992 | Ressi di Cervio | 405/38 |
| 5,584,605 A | * | 12/1996 | Beard et al. | 210/747.7 |
| 6,386,796 B1 | * | 5/2002 | Hull | 405/128.25 |
| 6,558,081 B2 | | 5/2003 | Hull | |

FOREIGN PATENT DOCUMENTS

WO WO 2005/058516 * 6/2005

OTHER PUBLICATIONS

Boles et al., Temporal Variation in Natural Methane Seep Rate Due to Tides, Coal Oil Point Area, California, J. Geophys. Res. 106:27077-27086, 2001.
McAnulty et al., NAPL Migration from Contaminated Sediment 2: Implications for Remedial Design, Presented at the Fourth International Conference on Remediation of Contaminated Sediments, Savannah, Georgia, 2007.
McLinn et al., From DNAPL to LNAPL—Methanogeneisis Facilitates MGP Tar Migration from Contaminated Sediment in a Tidal River, Proceedings of the Fourth International Conference on Remediation of Chlorinated and Recalcitrant Compounds, Monteray, California, 2004.
McLinn et al., NAPL Migration from Contaminated Sediment 1: Diagnosis and Transport Mechanisms, Presented at the Fourth International Conference on Remediation of Contaminated Sediments, Savannah, Georgia, 2007.
Mutch, Monitoring the Uplift of a Low-Permeability Sediment Cap Due to Gas Entrapment Beneath the Cap: Findings of the First 18 Months, The Annual International Conference on Soils, Sediments, Water and Energy, University of Massachusetts, Amherst, Massachusetts, 2005.
Zhao et al., Combined Active Capping/Wetland Demonstration in the Chicago River, Proceedings of the Fourth International Conference on Remediation of Contaminated Sediments, Savannah, Georgia, 2007.

* cited by examiner

*Primary Examiner* — John Kreck

(74) *Attorney, Agent, or Firm* — Quarles & Brady LLP

(57) ABSTRACT

Devices and methods for directing a non-aqueous phase liquid (NAPL) that migrate entrained in a fluid (e.g., a gas) from sediments in bodies of water by using trapping caps having an upwardly sloped surface toward an accumulation zone that contains a water table, in which migration of the gas carries the NAPL toward the accumulation zone.

20 Claims, 3 Drawing Sheets

DEVICES AND METHODS FOR DIRECTING MIGRATION OF NON-AQUEOUS PHASE LIQUIDS FROM SEDIMENT

CROSS-REFERENCE TO RELATED APPLICATIONS

This application is a continuation-in-part of U.S. patent application Ser. No. 12/259,017, filed Oct. 27, 2008 now abandoned, and entitled "DEVICES AND METHODS FOR DIRECTING MIGRATION OF NON-AQUEOUS PHASE LIQUIDS FROM SEDIMENT," which claims the benefit of U.S. Provisional Patent Application No. 60/982,626 filed Oct. 25, 2007, the disclosure of which is hereby incorporated by reference.

STATEMENT REGARDING FEDERALLY SPONSORED RESEARCH OR DEVELOPMENT

Not applicable.

BACKGROUND

The invention relates generally to methods for directing migration of non-aqueous phase liquids (NAPLs) from NAPL-contaminated sediment, and relates more particularly to methods of directing NAPL migration from such sediment to the surface of a body of water using devices through which NAPLs and other contaminants cannot percolate. The invention also contemplates directing migration of other granular materials that may contain contaminants, such as sand and silt, in a fluid, such as in a gas (i.e., via advective flow) or in a liquid (i.e., via conductive flow), especially where ebullition may be a factor.

NAPLs are highly hydrophobic liquids that have a low solubility and a low surface tension. Consequently, they are not water-soluble and form a separate phase when mixed with water. For example, oil is a NAPL that does not mix with water, and oil and water in a glass will separate into two separate phases. NAPLs can be lighter than water (light NAPLs (LNAPLs)) or denser than water (dense NAPLs (DNAPLs)). Hydrocarbons, such as gasoline, oil creosote and tar, as well as chlorinated solvents, such as trichloroethylene, are examples of NAPLs.

NAPLs are often found at or near industrial sites or former industrial sites. For example, historic wastewater outfalls from manufactured gas plant (MGP) sites often contain NAPL-contaminated sediment, such as MGP tar (e.g., coal tar), as well as other organic matter. Likewise, current or historical wastewater discharges from other industrial sites, such as refineries, wood-treating facilities, asphalt plants, aluminum smelters, coking plants, steel mills, chemical manufacturing facilities and others, may also contain NAPLs (both DNAPLs and LNAPLs).

When organic matter in NAPL-contaminated sediment anaerobically biodegrades, carbon dioxide ($CO_2$) and methane ($CH_4$) gases are produced that can migrate toward the surface as buoyant bubbles, entraining and transporting the highly hydrophobic NAPLs upward through a water column to the water surface, even though NAPL by itself may be denser than water. When the gas is released to the atmosphere at the water surface, NAPLs typically form a surface sheen because the net density of the gas bubble/NAPL is less than water and/or because the surface tension of NAPLs is much less than that of water. The sheen and NAPL droplets then are able to migrate along the water surface, creating a potential human health hazard and environmental hazard (e.g., coal tar is a known human carcinogen). Likewise, NAPL droplets adhere to shoreline structures or floating objects, such as boats or buoys. Occasionally, NAPL droplets lose their buoyancy when the gas is lost or when the surface tension of the water is broken. The NAPL droplets then fall back through the water column only to be re-deposited on the sediment. NAPL migration can also occur when ebullition or some other force (e.g., turbulent prop wash) disturbs sediment and causes NAPLs to migrate from the sediment. LNAPL from the sediment may also move upward due to buoyancy.

Certain techniques for directing NAPL migration are known to one of ordinary skill in the art and are summarized by McAnulty & McLinn. See McAnulty S & McLinn E, "NAPL migration from contaminated sediment 2: implications for remedial design," Paper A-031 in Remediation of Contaminated Sediments—2007 (Foote E & Durell, eds. 2007); see also McLinn E & McAnulty S, "NAPL migration from contaminated sediment 1: diagnosis and transport mechanisms," Paper A-030 in Remediation of Contaminated Sediments—2007 (Foote E & Durrell, eds. 2007), each of which is incorporated herein by reference as if set forth in its entirety. These techniques include, but are not limited to, the following: (1) removing NAPL-contaminated sediment; (2) placing filter caps over NAPL-contaminated sediment; (3) infilling over NAPL-contaminated sediment; (4) lowering the temperature of NAPL-contaminated sediment; (5) increasing the pressure over NAPL-contaminated sediment; (6) altering the properties of NAPL-contaminated sediment; and (7) preventing physical disturbance of NAPL-contaminated sediment. Each technique, however, presents its own advantages and disadvantages. The art, however, needs other devices and methods of controlling or preventing NAPL migration from NAPL-contaminated sediments.

BRIEF SUMMARY

In a first aspect, a method for directing a NAPL or other contaminant from a NAPL-contaminated sediment beneath a surface of a body of water toward an accumulation zone includes the step of interposing in a path of a plurality of NAPL-entraining gas bubbles (or LNAPL droplets) migrating between the sediment and the surface a device through which neither the gas nor the NAPL can percolate, the device defining, at or near one end, a vent or chimney in fluid communication with the accumulation zone and sloping upward toward the surface to an extent sufficient to direct the gas bubbles and any entrained NAPL from under the device to the vent or chimney and into the accumulation zone. The accumulation zone contains a water table or other barrier (e.g., a filter medium, such as a reactive core mat) that allows the gas to be liberated while accumulating residual NAPL. In some embodiments, the method also includes the step of treating the accumulated residual NAPL using any of the various techniques known to one of ordinary skill in the art.

It will be appreciated that the device can be constructed in situ, where NAPL accumulation in accord with the method is desired. The device for directing NAPL migration, including migration caused by ebullition, NAPL migration caused by surface tension, or NAPL migration caused by buoyancy, as well as other modes of NAPL migration, includes at least a control layer constructed of a material having a permeability sufficiently low to prevent percolation into the layer of the gas and the entrained NAPL. A suitable material for the gas control layer has an expected hydraulic conductivity no higher than about $10^{-2}$ cm/s. In some embodiments, the device includes a grading layer which, in use, is provided between the sediment and the control layer. In other embodiments, the device includes an armoring layer which, in use, is provided between the control layer and the water surface. In still other embodiments, the device includes a transmission layer interposed between the grading layer and the control layer. In some embodiments, the gas transmission layer has a hydraulic conductivity approximately 100 times greater than the gas control layer. In yet other embodiments, the device includes both the grading and armoring layers, positioned as described. Still further embodiments include the grading, armoring and transmission layers, positioned as described. The grading, armoring and transmission layers can be constructed of conventional materials suited for such purposes as are constructed for use in sediment caps.

These and other features, aspects and advantages of the present invention will become better understood from the description that follows. In the description, reference is made to the accompanying drawings, which form a part hereof and in which there is shown by way of illustration, not limitation, embodiments of the invention. The description of preferred embodiments is not intended to limit the invention to cover all modifications, equivalents and alternatives. Reference should therefore be made to the claims recited herein for interpreting the scope of the invention.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings, wherein.

Figure 1:
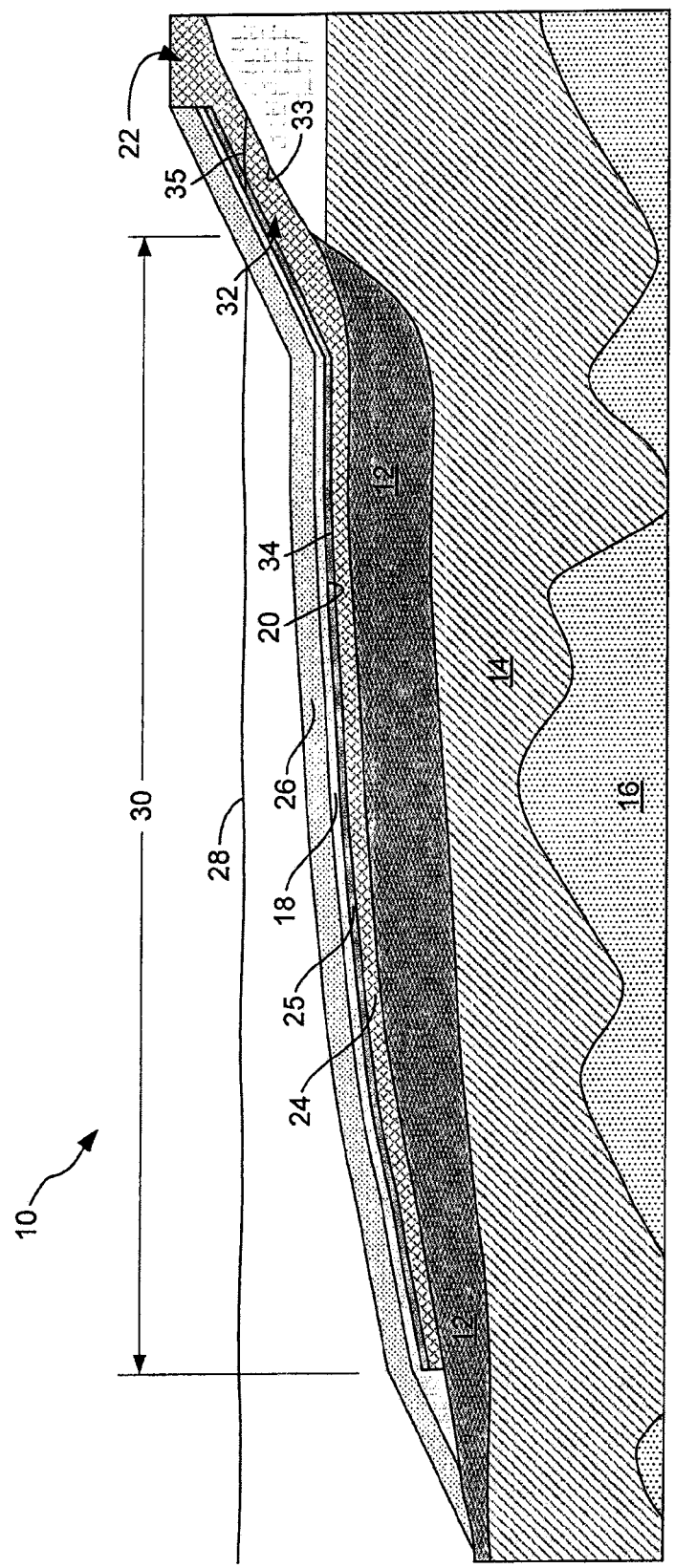
FIG. 1 shows a side sectional view of a NAPL-trapping cap device of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention relates to the inventor's observation that gas bubbles having entrained NAPL droplets that migrate from NAPL-contaminated sediments cause sheens to form on the surface of a body of water. This observation suggests that sheen formation can be controlled by directing gas bubbles having entrained NAPL droplets away from the water surface above the sediment to an accumulation zone where the gas can escape and where residual NAPL can be treated by methods known to one of ordinary skill in the art.

Referring to FIG. 1, the present invention provides a NAPL-trapping cap device 10 for directing NAPL migration from NAPL-contaminated sediment 12 in a body of water. The device 10 is constructed above the contaminated sediment 12, a floor layer 14 of the body of water, such as a riverbed, and bedrock 16. The device 10 includes a control layer 18 that includes at least an inferior surface 20 that is sloped upwards to direct gas bubbles and entrained NAPLs toward an accumulation zone 22. The device 10 may also include a grading layer 24 which, in use, is located between the contaminated sediment 12 and the control layer 18 to support the control layer 18. The device 10 may further include a transmission layer 25 interposed between the grading layer 24 and the control layer 18 that promotes efficient transmission of gas bubbles to the control layer 18. Further still, the device 10 may include an armoring layer 26 which, in use, is located between the control layer 18 and the water surface 28 to prevent erosion of the control layer 18. These and other aspects of the device 10 will be described in further detail below.

The slope of the control layer 18 in situ is upwards and begins at an outermost edge of a gas-facilitated contaminant transport zone 30 from the contaminated sediment 12, and preferably begins outside the outermost edge of the contaminated sediment 12, and ends at the accumulation zone 22. Although the entire control layer 18 may be sloped, at least the inferior surface 20 of the control layer 18 is sloped upwards toward the accumulation zone 22. The slope can, and will, vary depending upon the location of the contaminated sediment 12 (i.e., its depth in the body of water and its distance from the accumulation zone 22), but must be enough to direct gas bubbles that are being transported to the accumulation zone 22 for accumulation and/or treatment. If the slope is too low, gas bubbles may be trapped under the control layer 18. Trapped gas bubbles may ultimately lead to failure of the device. See Mutch, R. et al., "Monitoring the Uplift of a Low-Permeability Sediment Cap Due to Gas Entrapment Beneath the Cap: Findings of the First 18 Months" (2005). An exemplary slope is $1/60$ (an angle 0.95 degrees); as shown in laboratory testing, a slope of $1/60$ is sufficient to direct gas bubbles provided other conditions are met as described in further detail below. However, construction of the control layer 18 with such a low slope may be difficult due to settlement of the layers during or after construction. As such, the slope is preferably $1/10$ (an angle of 5.7 degrees) or greater. Laboratory testing has also shown that a slope of $1/10$ is sufficient to direct gas bubbles. An exemplary upper limit for the slope may be $10/57$ (an angle of 10 degrees) or even greater. However, the upper limit for the slope is limited by the underwater angle of repose, or the angle at which a specific material can be piled without sliding, of the material from which the control layer 18 is constructed.

A portion of the control layer 18 near the accumulation zone 22 defines a vent ("chimney") 32, which contains a water table 35 or other structure (i.e., a reactive core mat) that allows gas to escape from gas bubbles having entrained NAPLs, but retains NAPLs in the accumulation zone 22. By "water table," I mean a surface where water pressure equals atmospheric pressure. The vent 32 may also be defined in part by a shoreline surface or a variable fill layer upper surface 33. The vent 32 may have a greater slope than other portions of the control layer 18 depending on the shape of the surface 33.

The accumulation zone 22 is located adjacent the vent 32 of the control layer 18 may be defined in part by the surface 33. The accumulation zone 22 is preferably located in an area where contaminants can be sequestered or treated so that the potential for human or environmental exposure is limited. The accumulation zone 22 is gas-permeable and is constructed from a granular material, such as sand or gravel. The accumulation zone 22 may additionally contain amendments (e.g., carbon, coke or organoclay).

Figure 2:
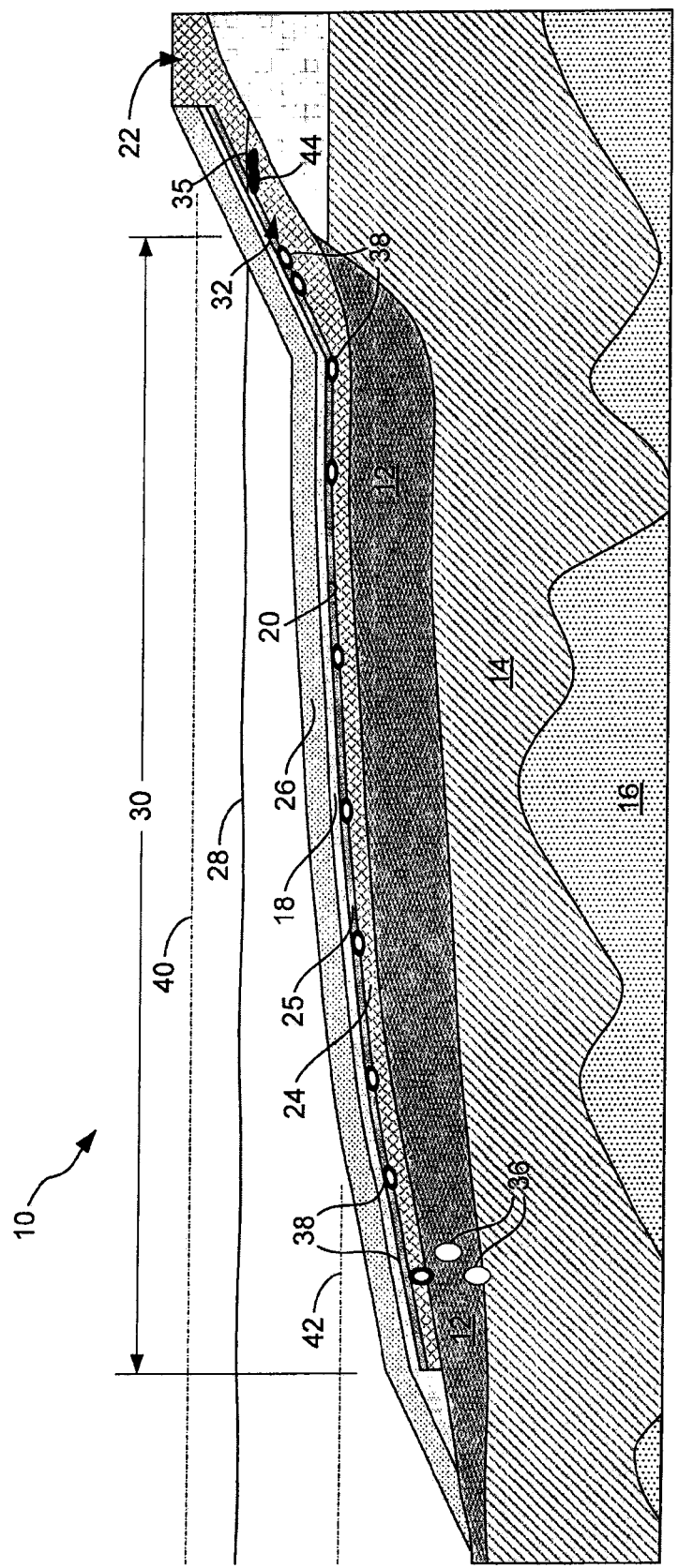
FIG. 2 shows migration of NAPL-entraining gas bubbles along a surface of the NAPL-trapping cap device of FIG. 1.

Referring to FIG. 2 and during operation of the device 10, sediment at an appropriate depth (e.g. less than 17 feet) generates gas bubbles 36 that migrate upward. The gas bubbles 36 entrain NAPLs and form NAPL-entraining gas bubbles 38 that escape from the NAPL-contaminated sediment 12. If the grading layer 24 is provided, the gas bubbles 38 first migrate through the grading layer 24 before contacting the control layer 18. After contacting the control layer 18, the gas bubbles 38 migrate along the upward slope of the inferior surface 20 of the control layer 18 to the accumulation zone 22. The NAPLs are trapped between a high tide (or high water) line 40 and a low tide (or low water) line 42 when the gas bubbles 38 reach the water table, and because the accumulation zone 22 is outside the body of water, the gas is vented, leaving behind a NAPL residue 44 that forms an interfacial film. The NAPL residue 44 may be treated by any of the various techniques known to one of ordinary skill in the art. For example, NAPL residue can be removed or treated with an agent that alters the chemical properties of NAPLs. See McAnulty & McLinn, supra.

Exemplary materials for the control layer 18 include, but are not limited to, the following: plastics, such as high-density polyethylene (HDPE); certain geotextiles (such as those available from Propex; Chattanooga, Tenn.); geocomposites (such as those available from CETCO; Arlington Heights, Ill.); a well-graded sand layer, or a clay layer (e.g., AquaBlok®; AquaBlok, Ltd.; Toledo, Ohio). In general, the material has resistance to chemical attack, has low gas permeability (estimated to be 1,000 millidarcys or less), has low NAPL permeability (estimated to be 1,000 millidarcys or less), and has sufficient strength to prevent rupturing under differential stresses caused by uplift forces from gas accumulation. Alternatively, the material for the control layer 18 may be selected in conjunction with the material for the transmission layer 25, if included, as described in further detail below.

As described briefly above, the device 10 can include a grading layer 24 that provides a stable surface upon which to construct the control layer 18 with an appropriate slope for directing the gas bubbles 38. The grading layer 24 helps provide a stable surface especially when the armoring layer 26 is present. Without the grading layer 24, the weight of the armoring layer 26 may cause differential settlement of the material below the control layer 18. The grading layer 24 should contact both the NAPL-contaminated sediment 12 and the control layer 18 to help support the control layer 18. To further support the control layer 18, the grading layer 24 should likewise have at its upper surface 34 an upward slope toward the accumulation zone 22. Depending on the shape of the surface of the contaminated sediment 12, the grading layer 24 may have generally uniform thicknesses as shown in FIG. 1. The grading layer 24 is gas- and contaminant-permeable, and can be formed of sand, gravel, crushed stone, or general fill.

The device 10 can include a transmission layer 25 that promotes more efficient transmission to the control layer 18 of the NAPL-entraining gas bubbles 38 than the grading layer 24. The transmission layer 25 can be located above the grading layer 24, if present, but below the control layer 18. Alternatively, the transmission layer 25 and the grading layer 24 may be combined to form a single layer that performs the functions of both individual layers. The transmission layer 25 is gas- and contaminant-permeable, and is a granular material (e.g., sand, crushed stone or gravel), a geomembrane, or a composite of granular material and a geomembrane. Alternatively, the transmission layer 25 may include multiple sections (e.g., upper and lower sections) that comprise different materials, such as different types of crushed stone. The transmission layer 25 can contain amendments (e.g., carbon, coke or organoclay).

As described briefly above, the material for the transmission layer 25, if included, may be selected in conjunction with the material for the control layer 18. Specifically, the materials for the transmission and the control layers 25 and 18 may be selected considering the permeability contrast, or the ratio of the permeability of the transmission layer 25 to the permeability of the control layer 18. The permeability contrast is preferably at least 100:1. Such a permeability contrast may be obtained by using poorly-graded gravel (with a permeability of $10^0$ cm/s) as the transmission layer 25 and well-graded sand (with a permeability of $10^{-2}$ cm/s) as the control layer 18. A high permeability contrast, such as 100:1, permits gas bubbles to easily pass through the transmission layer 25 and prevents gas bubbles from passing through the control layer 18. In addition, laboratory testing has shown that a permeability contrast of 100:1 may permit a relatively low slope, such as 1/60, to be used. Alternatively, a lower permeability contrast may be used although a higher permeability is recommended. A higher permeability contrast should be used as laboratory testing has shown that a permeability contrast of 10:1, obtained by using well-graded sand (with a permeability of $10^{-2}$ cm/s) as the transmission layer 25 and silty sand (with a permeability of $10^{-3}$ cm/s) as the control layer 18, may result in failure of the device 10. In this case, failure occurs because the gas bubbles attempt to permeate the control layer 18 instead of moving along the control layer 18 and through the transmission layer 25. Failure may even occur if a relatively large slope, such as 1/10, is used with a permeability contrast of 10:1.

As described briefly above, the device 10 can further include an armoring layer 26 atop the control layer 18 to prevent erosion of the control layer 18 as a result of water flow or ice attack. Likewise, the armoring layer 26 provides weight to counter any uplifting forces caused by gas accumulation under the control layer 18. The armoring layer 26 should be composed of a material with enough mass so that it will not be moved by the highest anticipated erosive forces. The armoring layer 26 can be a granular material (e.g., gravel, riprap or boulders), a geomembrane or a composite of granular material and a geomembrane. Alternatively, the armoring layer 26 can be articulated block mats (Nilex Geosynthetics; Denver, Colo.) or interlocking concrete blocks (e.g., Xbloc® from Delta Marine Consultants b.v.; Gouda, The Netherlands).

To construct the device 10, appropriate grades must first be present to allow the gas bubbles 38 to be conducted along the sediment-facing surface 20 of the control layer 18. In some, but not all, applications, an initial existing grade should be adjusted by constructing the grading layer 24 to ensure that the gas bubbles 38 migrate along the control layer 18 and transmit gas and NAPL toward the accumulation zone 22. Initial bathymetry should be established to determine the amount of fill needed to provide appropriate grades. The grading layer 24 is constructed by a sand sprinkling device, by a clamshell, by washing sand from a barge, or by a large-diameter tube if constructed in the wet (i.e., if water is present in the area of construction). Likewise, the transmission layer 25 and/or armoring layer 26, if present, are constructed similarly to the grading layer 24. The entire device 10, however, may be installed in the dry (i.e., if water has been temporarily removed from the area of construction).

The control layer 18 may be constructed using techniques that are akin to those for installing a landfill liner if the control layer 18 is a sheet of low-permeability material, such as a geotextile. Alternatively, the control layer 18 may be placed in a controlled manner from a barge if the control layer 18 is a clay layer, such as Aquablok®, or if the control layer 18 is a sand. The vent 32, if present, may be constructed from the same gas- and contaminant-permeable material as the grading layer 24 or the transmission layer 25 (typically sand or gravel). Alternatively, the vent 32 may be a culvert that is plumbed so that gas and NAPL migration in the gas control layer1 8 is sloped towards the vent 32. The vent 32 may further include amendments, such as organoclay or activated carbon, to help sequester migrated contaminants.

Figure 3:
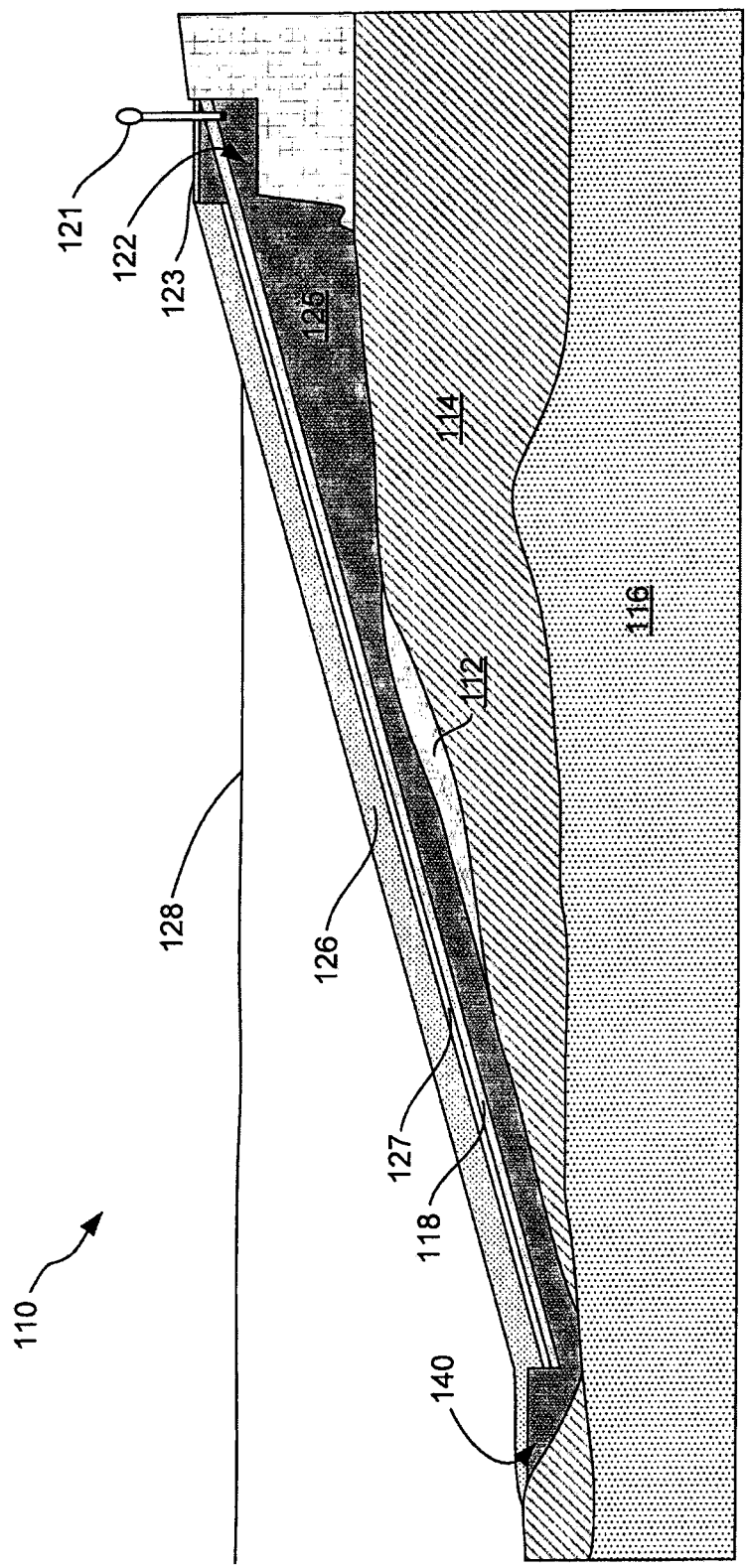
FIG. 3 shows a side sectional view of a second embodiment of a NAPL-trapping cap device of the present invention.

Referring now to FIG. 3, a second embodiment of a NAPL-trapping device 110 is disposed above a NAPL-contaminated sediment 112 in a body of water. The device 110 is also positioned above a floor layer 114 of the body of water, such as a riverbed, and bedrock 116. As described above, the device 110 includes a control layer 118 that is sloped upwards to direct gas bubbles and entrained NAPLs toward an accumulation zone 122. The accumulation zone 122 may include a passive gas vent 121 and a topsoil layer 123 to conceal the accumulation zone 122. The device 110 also includes a transmission layer 125 interposed between the floor layer 114 and the control layer 118 that promotes efficient transmission of gas bubbles to the control layer 118. The device 110 includes a bedding layer 127 disposed above the control layer 118. The bedding layer 127 may be, for example, crushed stone. An armoring layer 126 is located between the bedding layer 127 and the water surface 128 to prevent corrosion of the other layers.

Unlike the first embodiment, the NAPL-trapping device 110 includes a toe drain 140 at a lower end of the device 110 opposite the accumulation zone 122. The toe drain 140 may be formed by portions of the transmission layer 125 and the armoring layer 126 as shown in FIG. 3. As such, water can pass through the toe drain 140 relatively easily compared to the control layer 118. That is, water can move into and outside the device 110 through the toe drain 140, which may be advantageous during certain situations, such as tide changes, or when groundwater is discharging to surface water in the area to be capped. As a result, the toe drain 140 permits water to escape from the device 110 quickly and thereby prevents water from exerting excessive hydraulic forces on the control layer 118. Such hydraulic forces could ultimately lead to failure of the device 110.

The toe drain 140 is preferably spaced apart from the contaminated sediment 112 so that NAPL-entraining gas bubbles do not simply rise and pass through the toe drain 140. Instead, the NAPL-entraining gas bubbles are directed along the control layer 118 toward the accumulation zone 122 as described above. The control layer 118 is preferably sloped so that the NAPL-entraining gas bubbles are directed toward the accumulation zone 122 even as a large volume of water exits through the toe drain 140 as the tide goes out. An exemplary slope in this case is at least 3.5:1, although shallower slopes have been found to be adequate for transmitting gas.

The toe drain 140 may include a device or structure that treats water passing there through. For example, the toe drain 140 may treat arsenic-contaminated water using known methods. In this case, the device 110 advantageously directs and treats NAPL-entraining gas bubbles and water in different manners. Specifically, the device directs NAPL-entraining gas bubbles in a first direction toward the accumulation zone 122 for treatment and directs contaminated water in a second direction toward the toe drain 140 for treatment.

Unless defined otherwise, all technical and scientific terms used herein have the same meaning as commonly understood by one of ordinary skill in the art to which the invention belongs. Although any methods and materials similar to or equivalent to those described herein can be used in the practice or testing of the present invention, the preferred methods and materials are described herein.

The invention will be more fully understood upon consideration of the following non-limiting Examples.

EXAMPLES

Example 1

Utility of a Sand Layer for Directing NAPL Migration from NAPL-Contaminated Sediment During Ebullition NAPL migration from sediments to the surface of water bodies has been reported frequently at sites with NAPL-contaminated sediments, such as sediments contaminated with coal tar and creosote. Transport of NAPLs from NAPL-contaminated sediment is facilitated by gas ebullition caused by anaerobic biodegradation of organic matter in the sediment. A remedy often specified for these sites is a sand cap or a sand cap amended with sorbent materials (e.g., coke breeze or organoclays), or a reactive core mat (RCM) consisting of a geomembrane sandwiched around a reactive layer containing sorbent material such as organoclay. However, through testing, I recognized that such an art-recognized sand cap or RCM for controlling NAPL migration was not effective.

I used a laboratory study to assess the effectiveness of a sand layer for directing NAPL migration from a NAPL-contaminated sediment. I used a test column consisting of a Plexiglas® tube containing a tar source buried beneath a 30 cm-thick layer of sand. Water was added to the column until 5 cm of standing water covered the sand layer. To simulate ebullition, I injected air into the base of the sand column at approximately 200 ml/min under a gage pressure of 0.1 atmosphere. The gas and NAPLs migrated primarily through channels and fractures in the sand, and was not filtered through a network of stable pores. Tar was transported through the sand layer in 12 hours and accumulated on the water surface for several hours before losing its buoyancy and falling back down to the sand surface.

After terminating ebullition, I froze the test column to preserve sedimentary structures in the sand. Upon dissection of the column, I found that tar had migrated through the simulated sand cap in small (2 mm) channels only a few sand grains thick, and that at least one channel was continuous through the thickness of the column. These results call into question the effectiveness of sand caps for directing NAPL migration from sediment in the presence of ebullition.

Example 2

(Prophetic): Utility of a Sloped Layer for Directing NAPL Migration from NAPL-Contaminated Sediment During Ebulliton This example describes the utility of a sloped layer in treatment of a sediment having a tar deposit. By way of example, the inventor determined dimensions of a tar deposit based on results of a field sampling program at a large river having a daily average flow of 400 m$^3$/s, and a peak flow in excess of 4,000 m$^3$/s. The estimated velocity at the riverbed varied between 0 m/s at slack tide to nearly 3 m/s during extremely high flow. A bulkhead at the upstream edge of the cove created a large eddy where the river velocity was much less than in the main channel of the river. The sediment textures in the riverbed were characteristic of a high-energy environment—well- to poorly graded gravel with cobbles in the main channel of the river, and silty sand to well-graded gravel in the lee of the bulkhead.

Organic material in sediment in the lee of the bulkhead included sawdust, leaves, wood, coal ash, coal and MGP tar. Organic material in the main channel of the river was more sparse than in the sediments in the lee of the bulkhead, and was almost exclusively tar. The extent of the tar deposit was determined using several different methods including sediment probes, an underwater video survey, descriptions of roughly fifty sediment cores and chemical analysis of sediment samples. The tar deposit was more than 500 m long, and between 50 and 80 m wide; the tar deposit was elongated in the predominant downstream direction of river flow. Likewise, the tar deposit contained up to 4 m of tarry sediment in a sandbar at the sewer outfall; the central portion of the tar deposit contained more than 1 m of tarry sediment, 400 m downriver from the outfall. The tar deposit thinned and became discontinuous, moving laterally and longitudinally from the core of the tar deposit.

Sediment core samples were collected using a split-spoon sampler and a rotary drilling rig equipped with hollow-stemmed augers, as well as a barge-mounted Vibracore drilling rig. Sediment observations were made with an underwater video camera. In addition, shallow sediment samples were collected by a diver.

As gas bubbled up from the sediment at low tide from just below the surface of the river, gas samples were trapped and collected in a 10-liter, transparent, polyethylene tub. When a sufficient volume of gas was trapped in the tub, the gas composition was measured in the field with a portable infrared spectrophotometer (Landtec GA-90; Landtec; Colton, Calif.). The extent of the area of gas bubbling was determined by direct observations of the river collected over time.

Tar droplets and sheen samples were collected directly from the river's surface using Teflon® nets designed for collecting oil film samples (General Oceanics; Miami, Fla.). Positions on the river were determined using a handheld global positioning system (GPS Garmin eTtrex®; Garmin; Olathe, Kans.) for the ebullition observations. A differential GPS was used to determine the locations of borings.

Chemical analysis of sediment, tar droplet and sheen samples was performed for polycyclic aromatic hydrocarbons (PAHs) using a gas chromatograph/mass spectrometer in accordance with USEPA Method 8270. Tar density was determined using ASTM Method D455.

The gross composition of PAHs in the sediments of the tar deposit was similar to the composition of the tar droplets and sheens found on the river surface. Total PAH concentrations in all of these phases were similar (on the order of 100's to 10,000's of mg/kg). Most (75%) of the PAHs in the tar had a relatively low molecular weight (LMW PAHs), containing two or three benzene rings, whereas the remainder (25%) had a higher molecular weight (HMW PAHs), containing four to six benzene rings. The tar in the droplets and sheens were depleted with respect to LMW PAHs (e.g., BTEX and napthalenes) when compared to sediment.

The tar at the bottom of the river was denser than water (tar density was about 1.3 g/cm$^3$). For the tar to float from the riverbed to the river's surface, it needed to have a net density of less than 1 g/cm$^3$. Interestingly, tar at the bottom of the river became light enough to float on the river's surface when enough gas was entrained in the tar so that the net density of the tar was slightly less than 1 g/cm$^3$. After enough gas diffused out of the floating tar droplet, it became denser than water, and sank to the river's bottom. This sinking/floating/sinking behavior was also observed in tar samples in the laboratory (as described herein).

A second, related, tar migration mechanism occurred when tar droplets became entrained in gas bubbles migrating through sediment column. The tar preferentially accumulated in the gas bubbles because the surface tension of tar was less than the surface tension of the water.

The extent of bubbling (ebullition) and tar migration in the river over the tar deposit was observed on roughly thirty occasions over a three-year period. The tar deposit was at the head of the estuary, and spring tides in the area of the tar deposit were commonly more than 6 m. Based on more than 300 individual observations of tar migration, a roughly two hectare area of tar migration and ebullition at low tide was mapped. Tar migrated from the riverbed to the river surface in the nearshore area of the tar deposit. Tar migration typically was associated with an increase in the rate of gas bubbling from the river's bottom and that was more vigorous in the warm months, when river temperatures ranged up to 24° C. Winter river temperatures were around 1° C. or 2° C. The gas from the tar deposit was $CH_4$ (80 to 90% by volume) and $CO_2$ (6 to 12% by volume), which was consistent with anaerobic respiration of organic matter. See, Kehew A, Applied Chemical Hydrogeology (2001).

Changes in pressure exerted a strong influence on ebullition and tar migration. Ebullition was most vigorous at low tide in the nearshore portions of the tar deposit, where total PAH concentrations were high (100's to 1,000's of mg/kg), and the maximum water depth at low tide was less than 7 m. Gas bubbling was controlled by the water pressure over the riverbed.

Ebullition slowed, and eventually ceased when the tide came in because the depth of water, and hence the pressure over the tar deposit increased by 4 m to 7 m of water (0.36 to 0.63 atm). In a portion of the tar deposit located in deeper water, gas did not bubble to the river's surface at low tide, even in areas where several feet of tarry sediment were present and total PAH concentrations were very high (e.g., 10,000's of mg/kg). Bubble-facilitated tar migration, however, did not occur in deeper water because the tarry sediment did not accumulate enough gas to cause the tar to become lighter than water and float to the surface. Likewise, the rate of gas formation was not vigorous enough to cause bubble migration that would have entrained NAPLs and that would have facilitated transport of NAPLs.

In the channel of the river, the pressure was always greater than 7 m of water. In this area, either the gas bubbles never formed because the pressure stayed too high, or the gas dissolved at a fast enough rate such that bubbles did not accumulate to the extent that the tar became lighter than water.

In general, tar migration was a function of ebullition, surface tension of the tar and the river, water pressure, gas generation rates, and the presence of tar in the river sediment. Anaerobic biodegradation of the organic matter generated $CH_4$ and $CO_2$ gases in sediment. Gas built up in the sediments at high tide (when the confining hydraulic pressure was high) and was released episodically during low tide (when the hydraulic pressure was low). As gas bubbles percolated through the sediment, they became entrained in, and also entrained, particles of tar. The tar droplets became lighter than water once they contained enough gas, even though the tar alone (i.e., without the gas) was denser than water. The lighter-than-water tar droplets floated through a water column to the river's surface. In addition, tar droplets were transported to the water surface by being entrained in migrating gas bubbles. Once the tar droplets reached the water surface, they often were trapped there, because the surface tension of the water was greater than the surface tension of the tar. Hydrocarbons dispersed from the tar droplets and formed a sheen once they reached the river's surface. When the sheens formed, the surface area of the tar on the river increased, which thereby increased the potential for human exposure (e.g., dermal contact) with tar constituents.

Once the surface tension was broken or when sufficient gas leaked from floating tar droplets, the tar droplets became denser than water again and sank to the river's bottom, albeit some distance downstream from the point of release. The effect of this tar migration from the riverbed to the river surface increased the potential for human exposure to tar constituents.

In accord with the method, and as shown by way of example in FIGS. 1-2, a grading layer 24 of sand is provided over the entire area of the tar deposit 12. The grading layer 24 of sand is sloped from an edge of the tar deposit 12 located distal to an accumulation zone 22. The sand is deposited over the tar deposit 12 from a barge. In this example, the grading layer 24 also serves as a gas transmission layer 25. Next, a control layer 18 is constructed from clay, such as Aquablok®, or another material that may control gas flow. The control layer 18 is sloped at the same degree as the grading layer 24, is larger than the area of known ebullition and NAPL migration (approximately two hectares) and has a chimney 32 located at an edge that is adjacent to an accumulation zone 22. The control layer 18 is constructed on the grading layer 24 by dispersal on the water surface 28 using a barge. An armoring layer 26 is provided over the control layer 18. The armoring layer 26 provides weight to counter any uplifting forces caused by gas accumulation under the control layer 18 and helps prevent erosion of the control layer 18 from forces above the control layer 18. The armoring layer 26 is carefully constructed on the control layer 18 using a clamshell from a barge. The armoring layer 26 would be constructed of, e.g., eight- to twelve-inch stone.

As NAPL-entrained gas bubbles 38 escape from the NAPL-contaminated sediment 12 located below the device 10, they travel upward toward the device 10 and ultimately contact the control layer 18. The gas bubbles 38 then migrate along the upward slope of the inferior surface 20 of the control layer 18 to the accumulation zone 22. Because the NAPLs cannot migrate above the water table, the gas is vented at the chimney 32, leaving behind a NAPL residue 44. The NAPL residue 44 is sequestered from human and environmental receptors within the accumulation zone 22. The residue 44 may be treated in place by sorption to amendments in the fill material or is simply allowed to accumulate.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements within the spirit and scope of the invention as set forth in the appended claims.

The invention claimed is:

1. A method for directing a non-aqueous phase liquid (NAPL) from a NAPL-contaminated sediment beneath a surface of a body of water towards a NAPL accumulation zone comprising the step of:
   interposing in a path of a plurality of NAPL-entraining gas bubbles migrating between the sediment and the surface a device through which neither the gas nor the NAPL can percolate, the device defining, at or near one end, a vent in fluid communication with the accumulation zone and the device sloping upward towards the surface to an extent sufficient to direct the gas bubbles from under the device to the vent and into the accumulation zone.

2. The method of claim 1, wherein the upward slope towards the accumulation zone is at least 1/60.

3. The method of claim 1, wherein the accumulation zone contains a water table.

4. The method of claim 1, wherein the device comprises a first layer of a material through which neither the gas nor the NAPL can percolate.

5. The method of claim 4, wherein the material is selected from a group consisting of a high-density polyethylene, a geotextile, a sand, and a clay.

6. The method of claim 4, wherein the device comprises a grading layer interposed between the first layer and the NAPL-contaminated sediment.

7. The method of claim 6, wherein the grading layer comprises a material selected from a group consisting of sand and sand with amendments.

8. The method of claim 4, wherein the device comprises a transmission layer interposed between the first layer and the NAPL-contaminated sediment.

9. The method of claim 8, wherein the transmission layer and the first layer have a permeability contrast that is at least 100:1.

10. The method of claim 4, further comprising an armoring layer between the first layer and the surface.

11. The method of claim 10, wherein the armoring layer comprises a material selected from a group consisting of an articulated block mat, gravel, boulder-sized granular material and concrete.

12. A method for reducing toxicity of a NAPL from a NAPL-contaminated sediment beneath a surface of a body of water comprising the steps of:
   interposing in a path of a plurality of NAPL-entraining gas bubbles migrating between the sediment and the surface a device through which neither the gas nor the NAPL can percolate, the device defining, at or near one end, a vent in fluid communication with a NAPL accumulation zone and the device sloping upward towards the surface to an extent sufficient to direct the gas bubbles from under the device to the vent and into the accumulation zone such that the gas vents and residual NAPL remains at the accumulation zone, and the device including a control layer having an inferior surface along which the gas bubbles are directed and a transmission layer below the control layer through which the gas bubbles permeate.

13. The method of claim 12, wherein the upward slope towards the accumulation zone is at least 1/60.

14. The method of claim 12, wherein the transmission layer and the control layer have a permeability contrast that is at least 100:1.

15. The method of claim 14, wherein the transmission layer is poorly-graded gravel and the control layer is well-graded sand.

16. The method of claim 12, further comprising the step of directing water within the device towards a toe drain disposed at an end of the device opposite the vent.

17. A device for directing movement in a body of water of a plurality of NAPL-entraining gas bubbles released from a NAPL-contaminated sediment disposed in the body of water to an accumulation zone, comprising:
   a control layer disposed in the body of water above the NAPL-contaminated sediment, the control layer having an upward slope to direct the NAPL-entraining gas bubbles, and near one end the control layer defining a vent in fluid communication with the accumulation zone to direct the NAPL-entraining bubbles towards the accumulation zone; and a transmission layer disposed in the body of water and interposed between the control layer and the NAPL-contaminated sediment, the transmission layer being more permeable than the control layer.

18. The device of claim 17, wherein the control layer has a slope of at least $\frac{1}{10}$.

19. The device of claim 17, wherein the transmission layer and the control layer have a permeability contrast of at least 100:1.

20. The device of claim 17, wherein the transmission layer defines a toe drain disposed at an end of the control layer opposite the vent.

* * * * *